June 16, 1925.

A. HARRIS

AUTOMOBILE BUMPER

Filed July 12, 1924

1,542,240

INVENTOR
ALBERT HARRIS
BY

Patented June 16, 1925.

1,542,240

UNITED STATES PATENT OFFICE.

ALBERT HARRIS, OF TORONTO, ONTARIO, CANADA.

AUTOMOBILE BUMPER.

Application filed July 12, 1924. Serial No. 725,722.

*To all whom it may concern:*

Be it known that I, ALBERT HARRIS, a subject of the King of Great Britain, and a resident of the city of Toronto, in the county of York, in the Province of Ontario, Canada, have invented certain new and useful Improvements in Automobile Bumpers, of which the following is a specification.

My invention relates to improvements in automobile bumpers, and the object of the invention is to devise a bumper which will be strong and durable and yet which will have a cushioning effect when subjected to impact so that the danger to fracture of the bumper members will be minimized, and it consists essentially of the arrangement and construction of parts hereinafter more particularly described.

In the drawings like characters of reference indicate corresponding parts in each figure.

Figure 1:
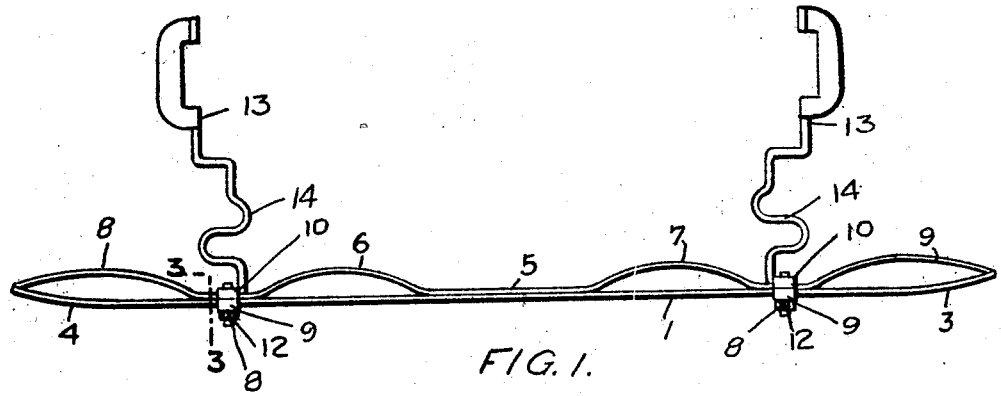
Fig. 1 is a plan view of my bumper.
Figure 2:
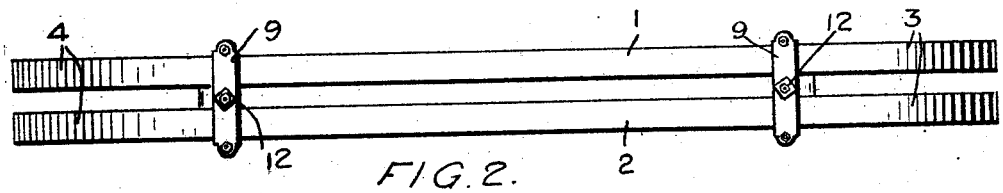
Fig. 2 is a front elevation.
Figure 3:
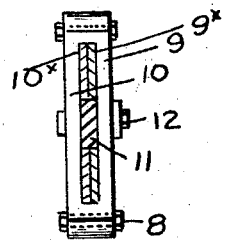
Fig. 3 is an enlarged sectional detail on line 3—3, Fig. 1.

1 and 2 indicate a pair of bar members formed of resilient material and having inwardly curved ends 3 and 4.

5 is a bar member opposing each of the bar members 1 and 2. Each of the bar members 5 is provided with bowed portions 6 and 7 to each side of the centre thereof and with bowed portions 8 and 9 at their ends, the extremities of which bear against the extremities of the inturned ends 3 and 4.

9 and 10 are clamping plates secured together by bolts 8 and 9, the inner faces of the plates 9 and 10 being recessed at $9^x$ and $10^x$ to receive the bar members 1 and 5 and 2 and 5 in the upper and lower portions thereof.

Between the bar members 1 and 5 and 2 and 5 extend bracket members which are secured between the plates 9 and 10, by bolts 12. The bracket members extend horizontally and are provided at their opposite extremities with means for attachment to a chassis frame, as indicated at 13.

The intermediate portion of each member is curved into a compound curve, as indicated at 14, so as to have a slight resilience when the bumper is subjected to impact.

When direct impact is made upon the centre of the bumper, the portions 14 yield, the bowed portions 6 and 7 reinforcing the bar members 1 and 2 so as to minimize the danger to fracture during the yielding of such bar members 1 and 2. Should the impact be made at either extremity of the bumper, the ends of the bar members 3 and 4, and the ends $6^x$ and $7^x$ freely contacting one with the other, permit of the yielding action which permits the bumper to give at the ends and take up the impact without being fractured.

From this description it will be seen that I have devised a very simple form of bumper which will be strong and durable and which will not be subjected to fracture during an impact.

What I claim as my invention is:

A bumper for automobiles, comprising a main bar member curved inward at its ends, a bar member fitting against the aforesaid bar member intermediately of its length and having its ends bowed outward from such main bar member and the extremities of the bowed portions curved inward to bear freely against the inturned ends of the main bar member, and means for clamping the main and bowed bar members together.

ALBERT HARRIS.